United States Patent
Tsunehara et al.

(10) Patent No.: US 6,928,292 B2
(45) Date of Patent: Aug. 9, 2005

(54) MOBILE HANDSET WITH POSITION CALCULATION FUNCTION

(75) Inventors: Katsuhiko Tsunehara, Hachioji (JP); Mikio Kuwahara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/094,980

(22) Filed: Mar. 12, 2002

(65) Prior Publication Data

US 2002/0132626 A1 Sep. 19, 2002

(30) Foreign Application Priority Data

Mar. 19, 2001 (JP) .................................. 2001-077416

(51) Int. Cl.[7] .................................................. H04Q 7/20
(52) U.S. Cl. .................... 455/456.1; 455/456.3; 455/456.5; 455/456.6; 342/357.14; 342/357.1
(58) Field of Search ............ 455/456.1, 456.3, 455/456.5, 456.6; 342/357.14, 450, 457

(56) References Cited

U.S. PATENT DOCUMENTS

| | | | | |
|---|---|---|---|---|
| 6,002,363 A | * | 12/1999 | Krasner ................... | 342/357.1 |
| 6,249,245 B1 | * | 6/2001 | Watters et al. .......... | 342/357.03 |
| 6,430,416 B1 | * | 8/2002 | Loomis .................... | 455/456.1 |
| 6,731,672 B1 | * | 5/2004 | Eschenbach .............. | 375/140 |
| 6,771,213 B2 | * | 8/2004 | Durst et al. ............. | 342/357.07 |

FOREIGN PATENT DOCUMENTS

| | | |
|---|---|---|
| JP | 06-148308 | 11/1992 |
| JP | 10-051840 | 7/1996 |
| JP | 11-201765 | 1/1998 |
| JP | 11-257982 | 3/1998 |
| JP | 2000-244968 | 2/2000 |
| JP | 2001-305210 | 4/2000 |
| KR | 2000-0037429 | 4/2000 |
| WO | WO 99/47943 | 3/1999 |
| WO | WO 01/09638 | 5/2000 |

OTHER PUBLICATIONS

Nikkei Communications 2000.7.17, pp. 115–121.

* cited by examiner

*Primary Examiner*—Vivian Chin
*Assistant Examiner*—Sanh Phu
(74) *Attorney, Agent, or Firm*—Reed Smith LLP; Stanley P. Fisher, Esq.; Juan Carlos A. Marquez, Esq.

(57) ABSTRACT

To extend the areas where a mobile handset can determine its position using radio waves, the present invention provides a mobile handset that is equipped with both position calculation means using radio waves from GPS satellites and position calculation means using RF carriers from cellular base stations. Positioning results obtained from both of these position calculation means are combined and weighted with GPS positioning reliability and cellular positioning reliability, respectively. A weighted mean of these results is then output as a final position calculation result.

2 Claims, 3 Drawing Sheets

MOBILE HANDSET WITH POSITION CALCULATION FUNCTION

CLAIM OF PRIORITY

This application claims priority to Japanese Patent Application No. 2001-077416 filed on Mar. 17, 2001.

BACKGROUND OF THE INVENTION

1. Field of the Invention

The present invention relates to a mobile handset capable of determining its current position by using radio waves.

2. Description of the Background

Various methods by which a mobile handset may determine its current position, for example, using the Global Positioning System (GPS), have been used in practical applications, such as car navigation. A method also exists in which, in conjunction with the method using GPS, a cellular telephone network is used to notify a mobile handset of auxiliary information for receiving radio waves for GPS. See, *Nikkei Communications,* issued by Nikkei Business Publications, Inc., Jul., 16, 2000 at p. 120.

An additional method is known in which a mobile handset receives radio-frequency (RF) carriers transmitted from base stations for cellular telephony communications, and the handset calculates its current location using the propagation delay time of the RF carriers. See, Japanese Patent Application No. JP-A-181242/1995.

As radio signals from satellites for GPS propagate and reach the surface of the earth, the intensity of the signals decreases. Particularly indoors, the signal intensity greatly attenuates because of blockage by ceilings, walls, and the like, such that the received signal quality is significantly deteriorated. Because of this, it is difficult for a mobile handset using the above GPS method to receive sufficient quality GPS signals required for determining the position of the handset in indoor environments. In other words, the mobile handset cannot accurately determine its position if indoors.

Additionally, when the handset is in proximity to a tall building or other obstruction, a direct view of the sky may be limited. Consequently, the number of GPS satellites which meet the received signal quality requirements for practical position determination is low in theses areas, and it is difficult for a mobile handset to determine its position by the GPS method.

At the same time, the position determination method using RF carriers from base stations for cellular telephony communications has the following limitation. If a mobile handset is used very near a base station or in a rural or mountainous area where a limited number of base stations exist, the number of base stations which transmit signals that meet received signal quality requirements for practical position determination is low at the mobile handset's location. Consequently, the above method can not be used in such circumstances.

When a mobile handset attempts to determine its position by either the GPS method or the method using RF carriers from cellular base stations, there may be some locations where an accurate position determination can not be established. Consequently, location information serviceable areas may be restricted by conventional methods.

SUMMARY OF THE INVENTION

To address the above problems, a mobile handset according to the present invention is equipped with both position calculation means using radio waves from GPS satellites and position calculation means using RF carriers from cellular base stations. The positioning results obtained from both position calculation means may then be combined, thus producing a final position calculation result. On the one hand, the mobile handset can receive good-quality positioning signals from a plurality of cellular base stations even when it is indoors or very near a tall building. On the other hand, the handset is also able to receive signals of sufficient intensity for position determination using GPS even when the handset is very near a cellular base station or in a rural or mountain area.

The mobile handset of the present invention preferably combines the positioning results obtained by both of these position calculation means depending on the reliability of the positioning by each of the position calculation means. Thus, the mobile handset can accurately determine its position in diverse ambient conditions and environments.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Figure 2:
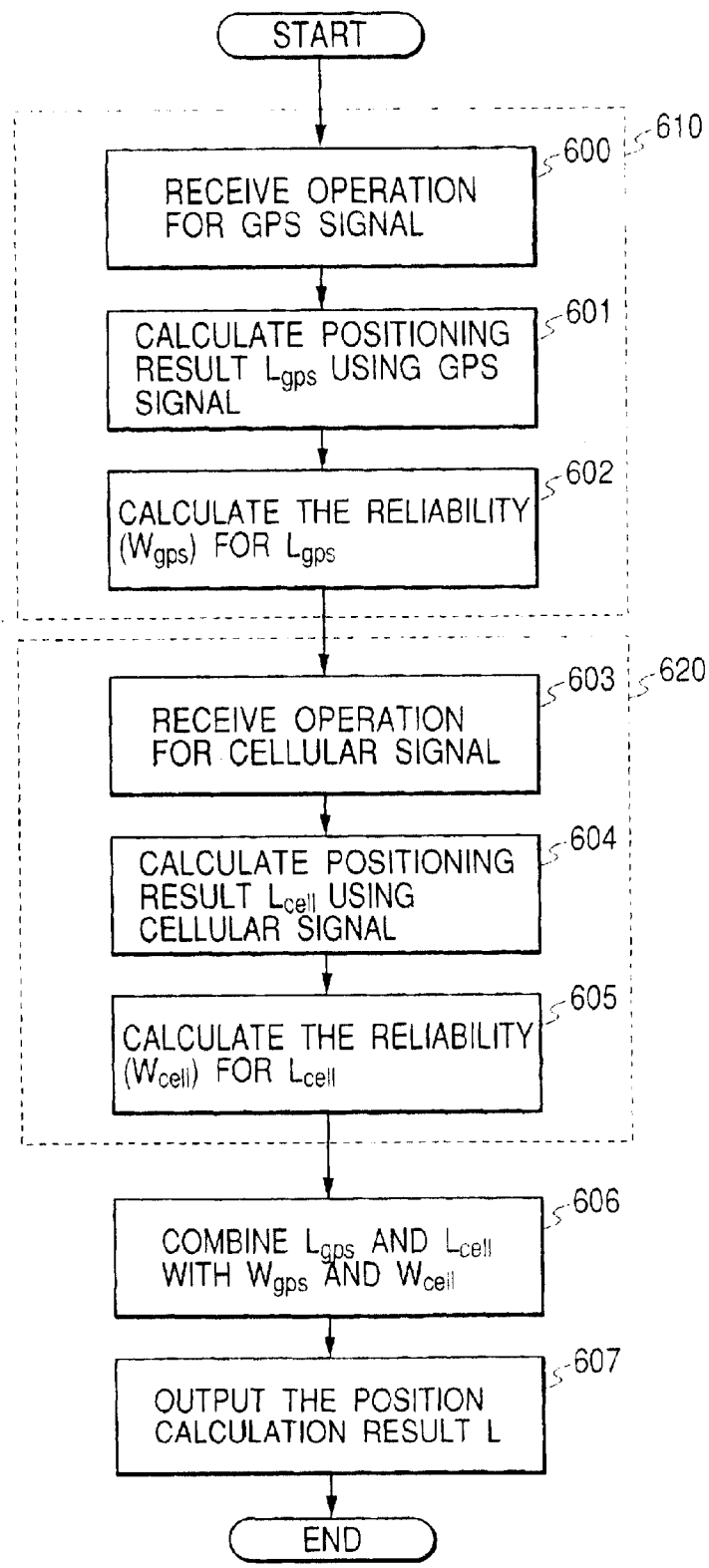
FIG. 2 depicts an exemplary position determination method according to the present invention.

FIG. 2 illustrates an example of the method in which a mobile handset determines its position, according to the present invention. Initially, the mobile handset executes a receive operation for GPS-oriented signals (hereinafter referred to as GPS signals) 600 including synchronization acquisition and reception timing measurements required for position determination using GPS. Thereafter, the mobile handset calculates its position using the GPS signals; that is, the handset calculates positioning result $L_{gps}$ using the GPS signals 601. The mobile handset also calculates the reliability ($W_{gps}$) for $L_{gps}$ 602 using the number of GPS satellites used in calculating $L_{gps}$ and the received signal quality (such as a signal-to-noise ratio in decibels) for the signals from each GPS satellite. These GPS-related processes are labeled 610.

Additionally, the mobile handset executes a receive operation for cellular-oriented signals (hereinafter referred to as cellular signals) 603 including synchronization acquisition and reception timing measurements required for position determination using cellular signals from cellular base stations. Thereafter, the mobile handset calculates its position using the cellular signals; that is, the handset calculates positioning result $L_{cell}$ using the cellular signals 604. The mobile handset also calculates the reliability ($W_{cell}$) for $L_{cell}$ 605 using the number of cellular base stations used in calculating $L_{cell}$ and the received signal quality for the signals from each cellular base station. These cellular-related processes are labeled 620.

The mobile handset then preferably combines the positioning result $L_{gps}$ using the GPS signals and the positioning result $L_{cell}$ using the cellular signals (obtained in the above steps) depending on the reliability $W_{gps}$ and the reliability $W_{cell}$ for each positioning (step 606). The mobile handset then outputs a final position calculation result L 607.

It should be noted here that the order of the steps 610 required for a position determination using GPS signals and the steps 620 required for a position determination using cellular signals may be reversed or both sets of steps may be carried out simultaneously. The order of the GPS/cellular steps is not limiting.

Figure 1:
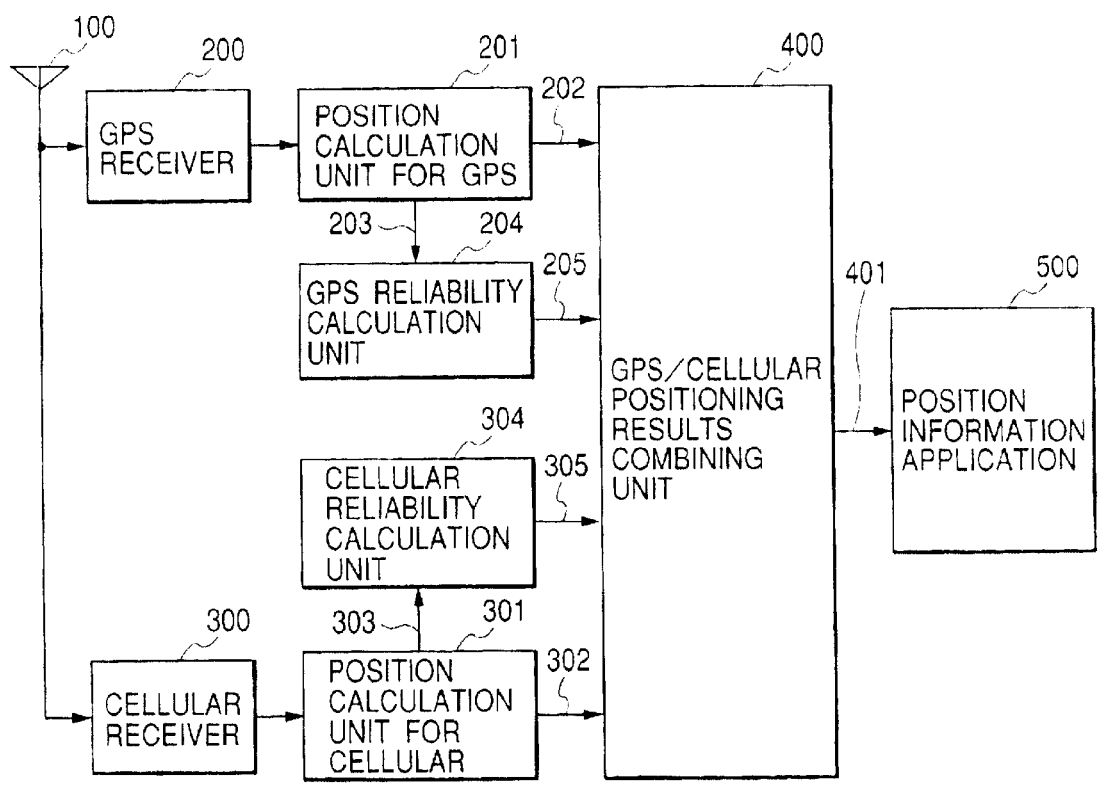
FIG. 1 is a block diagram representing the structure of a mobile handset, according to a preferred embodiment of the present invention.

FIG. 1 represents an exemplary structure of a mobile handset that executes the position determination method according to the present invention. A GPS receiver 200 executes the receive operations required for position determination which preferably include: receiving the GPS signals of high/medium frequencies out of the signals received by an antenna 100; baseband signal modulation; synchronization acquisition; and reception timing calculation.

Based on the result of the operations executed by the GPS receiver 200, a position calculation unit for GPS 201 calculates the position of the mobile handset using the GPS signals and outputs the GPS-based position calculation result 202 to a GPS/cellular positioning results combining unit 400. At the same time, the position calculation unit for GPS 201 outputs information about the reliability of the GPS-based position calculation result 203 (for example, the number of GPS satellites used in the above calculation and the received signal quality of the signals from the GPS satellites) to a GPS reliability calculation unit 204.

The GPS reliability calculation unit 204 calculates the reliability of the GPS-based position calculation result 205 based on the information about the reliability input from the position calculation unit for GPS 201, and the unit 204 outputs the reliability 205 to the GPS/cellular positioning results combining unit 400. The GPS reliability calculation unit 204 calculates the reliability in a manner in which, for example, the number of GPS satellites used when the position calculation unit for GPS 201 calculated the handset position is used as the reliability 205. Alternatively, the quality of the signals received from the GPS satellites used when the position calculation unit for GPS 201 calculated the handset position might be used. In this case, the signal of the worst quality received from a GPS satellite is considered influential as a determinative factor of the reliability of the position calculation result.

By way of illustration, if the received signal quality (for example, the signal-to-noise ratio (SNR) in decibels) is used, the lowest SNR among the SNRs of the signals received from the GPS satellites may be used as the reliability 205. In some cases, the GPS reliability calculation unit 204 may determine that positioning by GPS is impossible. (For example, if the number of GPS satellites used is found to be two or less). In that event, the GPS reliability calculation unit 204 preferably outputs a value of 0 as the reliability 205 so that the GPS-based position calculation result 202 has no effect on further processing.

In much the same way, a cellular receiver 300 executes the receive operations required for position determination which preferably include: receiving the cellular signals of high/medium frequencies out of the signals received by the antenna 100; baseband signal modulation; synchronization acquisition; and reception timing calculation.

Based on the result of the operations executed by the cellular receiver 300, a position calculation unit for cellular 301 calculates the position of the mobile handset using the cellular signals and outputs the cellular-based position calculation result 302 to the GPS/cellular positioning results combining unit 400. At the same time, the position calculation unit for cellular 301 outputs information about the reliability of the cellular-based position calculation result 303 (for example, the number of cellular base stations used in the above calculation and the received signal quality of the signals from the cellular base stations) to a cellular reliability calculation unit 304.

The cellular reliability calculation unit 304 calculates the reliability of the cellular-based position calculation result 305 based on the information about the reliability input from the position calculation unit for cellular 301, and the unit 304 outputs the reliability 305 to the GPS/cellular positioning results combining unit 400. The cellular reliability calculation unit 304 preferably calculates the reliability in the same manner as the GPS reliability calculation unit 204. For example, the number of cellular base stations used when the position calculation unit for cellular 301 calculated the handset position or the lowest SNR among the SNRs of the signals received from the cellular base stations may be used as the reliability 305.

In some cases, the cellular reliability calculation unit 304 may determine that calculating the position of the handset using cellular signals is not possible, as was the case for the GPS reliability calculation unit 204. In that event, the cellular reliability calculation unit 304 preferably outputs a value of 0, so that the position calculation result 302 using the cellular signals has no effect on further processing.

The GPS/cellular positioning results combining unit 400 combines the positioning result 202 using the GPS signals and the positioning result 302 using the cellular signals, depending on the reliability 205 and the reliability 305 for each positioning, and it 400 outputs a position calculation result 401.

Figure 3:
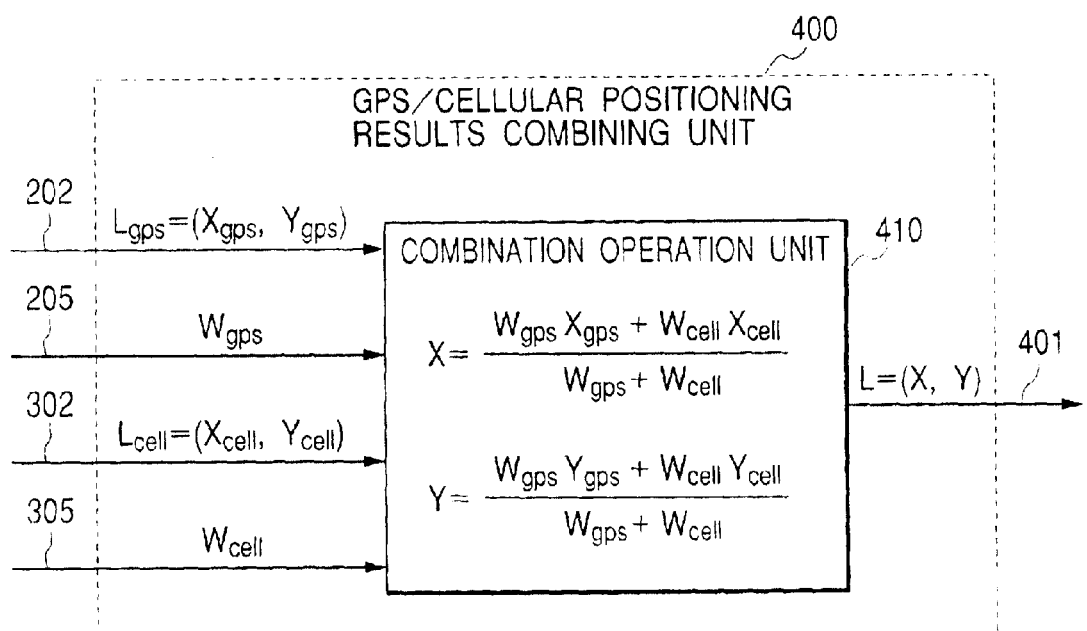
FIG. 3 represents an exemplary configuration of a GPS/Cellular positioning results combining unit of the handset.

FIG. 3 represents an exemplary embodiment of the GPS/cellular positioning results combining unit 400. In the FIG. 3 example, the positioning result 202 using the GPS signals and the positioning result 302 using the cellular signals are weighted with the reliability 205 and the reliability 305, respectively. The combination operation unit 410 calculates a weighted mean of the above results and outputs the result as the position calculation result 401.

The position calculation result 401 is input to a position information application 500 (see, FIG. 1). Using the position calculation result 401, the position information application 500 preferably provides information to the user of the mobile handset service, such as information about recommended stores around the user and a map of routes and nearby roads. Any type of location-specific information may be provided by such a service.

It should be noted here that although one single antenna 100 is shared for receiving GPS signals and cellular signals in the presently preferred embodiment, one antenna for GPS signals and another antenna for cellular signals may be separately provided on the terminal handset.

In accordance with the present invention, a single mobile handset can cover both areas where position determination using GPS signals is practical and areas where position determination using cellular signals is practical thereby extending location information serviceable areas. Because the mobile handset determines its position using both GPS signals and cellular signals, the accuracy of the position determination may be enhanced as compared to position determinations using either GPS signals or cellular signals alone.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A mobile handset capable of determining its position using radio waves, the mobile handset comprising:

GPS receiver means for receiving GPS-oriented signals and generating received GPS signals;

GPS position calculation means for calculating the mobile handset's position from the received GPS signals and outputting a GPS-based position result;

GPS reliability calculation means for calculating GPS positioning reliability based on the GPS-based position result;

cellular receiver means for receiving cellular-oriented signals and generating received cellular signals;

cellular position calculation means for calculating the mobile handset's position from the received cellular signals and outputting a cellular-based position result;

cellular reliability calculation means for calculating cellular positioning reliability based on the cellular-based position result; and GPS/cellular positioning results combining means for combining the GPS-based position result and the cellular-based position result with the GPS positioning reliability and the cellular positioning reliability, wherein said GPS and cellular receiver means are adapted to receive GPS and cellular-oriented signals simultaneously.

2. A method for determining a combined GPS/cellular position result for a device, comprising the steps of:

receiving GPS-oriented signals;

receiving cellular oriented signals;

calculating a GPS-based position of the device based on the received GPS-oriented signal;

calculating a cellular-based position of the device based on the received cellular-oriented signals;

calculating a GPS positioning reliability based on the GPS-based position;

calculating a cellular positioning reliability based on the cellular-based position; and outputting a combined GPS/cellular device position based on the GPS-based position, the GPS positioning reliability, the cellular-based position, and the cellular positioning reliability, wherein said GPS and cellular signals are received simultaneously and said GPS-based and cellular-based positions are calculated simultaneously.

* * * * *